United States Patent
Havlir et al.

(10) Patent No.: US 11,080,101 B2
(45) Date of Patent: Aug. 3, 2021

(54) DEPENDENCY SCHEDULING FOR CONTROL STREAM IN PARALLEL PROCESSOR

(71) Applicant: Apple Inc., Cupertino, CA (US)

(72) Inventors: Andrew M. Havlir, Orlando, FL (US); Jason D. Carroll, Oviedo, FL (US); Karl D. Mann, Geneva, FL (US)

(73) Assignee: Apple Inc., Cupertino, CA (US)

( * ) Notice: Subject to any disclaimer, the term of this patent is extended or adjusted under 35 U.S.C. 154(b) by 112 days.

(21) Appl. No.: 16/361,910

(22) Filed: Mar. 22, 2019

(65) Prior Publication Data
US 2020/0301753 A1 Sep. 24, 2020

(51) Int. Cl.
G06F 9/46 (2006.01)
G06F 9/52 (2006.01)

(52) U.S. Cl.
CPC .................... *G06F 9/522* (2013.01)

(58) Field of Classification Search
CPC ...................................... G06F 9/522
See application file for complete search history.

(56) References Cited

U.S. PATENT DOCUMENTS

| | | | |
|---|---|---|---|
| 8,817,031 B2 | 8/2014 | Hakura et al. | |
| 9,542,192 B1 | 1/2017 | Wilt et al. | |
| 9,575,760 B2 | 2/2017 | Kini et al. | |
| 2005/0193138 A1* | 9/2005 | Kim | H04L 67/02 709/231 |
| 2012/0017069 A1 | 1/2012 | Bourd et al. | |
| 2014/0310535 A1* | 10/2014 | Sibert | H04L 9/0863 713/193 |
| 2014/0337818 A1* | 11/2014 | Dodge | G06F 9/541 717/120 |
| 2016/0117206 A1* | 4/2016 | Che | G06F 9/547 718/102 |
| 2017/0147233 A1 | 5/2017 | De | |
| 2020/0301753 A1* | 9/2020 | Havlir | G06F 9/522 |

* cited by examiner

*Primary Examiner* — Camquy Truong
(74) *Attorney, Agent, or Firm* — Kowert, Hood, Munyon, Rankin & Goetzel, P.C.

(57) ABSTRACT

Techniques are disclosed relating to processing a control stream such as a compute control stream. In some embodiments, the control stream includes kernels and commands for multiple substreams. In some embodiments, multiple substream processors are each configured to: fetch and parse portions of the control stream corresponding to an assigned substream and, in response to a neighbor barrier command in the assigned substream that identifies another substream, communicate the identified other substream to a barrier clearing circuitry. In some embodiments, the barrier clearing circuitry is configured to determine whether to allow the assigned substream to proceed past the neighbor barrier command based on communication of a most-recently-completed command from a substream processor to which the other substream is assigned (e.g., based on whether the most-recently-completed command meets a command identifier communicated in the neighbor barrier command). The disclosed techniques may facilitate parallel control stream parsing and substream synchronization.

20 Claims, 7 Drawing Sheets

DEPENDENCY SCHEDULING FOR CONTROL STREAM IN PARALLEL PROCESSOR

BACKGROUND

Technical Field

This disclosure relates generally to parallel processor architectures and more particularly to dependencies within a control stream.

Description of the Related Art

Given their growing compute capabilities, graphics processing units (GPUs) are now being used extensively for large-scale compute workloads. APIs such as Metal and OpenCL give software developers an interface to access the compute power of the GPU for their applications. In recent times, software developers have been moving substantial portions of their applications to using the GPU. Furthermore, GPUs are becoming more powerful in new generations.

Work to be performed on a parallel processor is often specified as a control stream that includes commands and kernels. For example, a program executed by a central processing unit may use one or more compute kernels that are compiled for another processor such as a GPU or digital signal processor (DSP). Compute workloads are often specified using task graphs and may include a mix of dependent and non-dependent kernels. When one kernel depends on another, it should wait for the other kernel to finish before it begins. Non-dependent kernels may execute in parallel, however.

Figure 1:
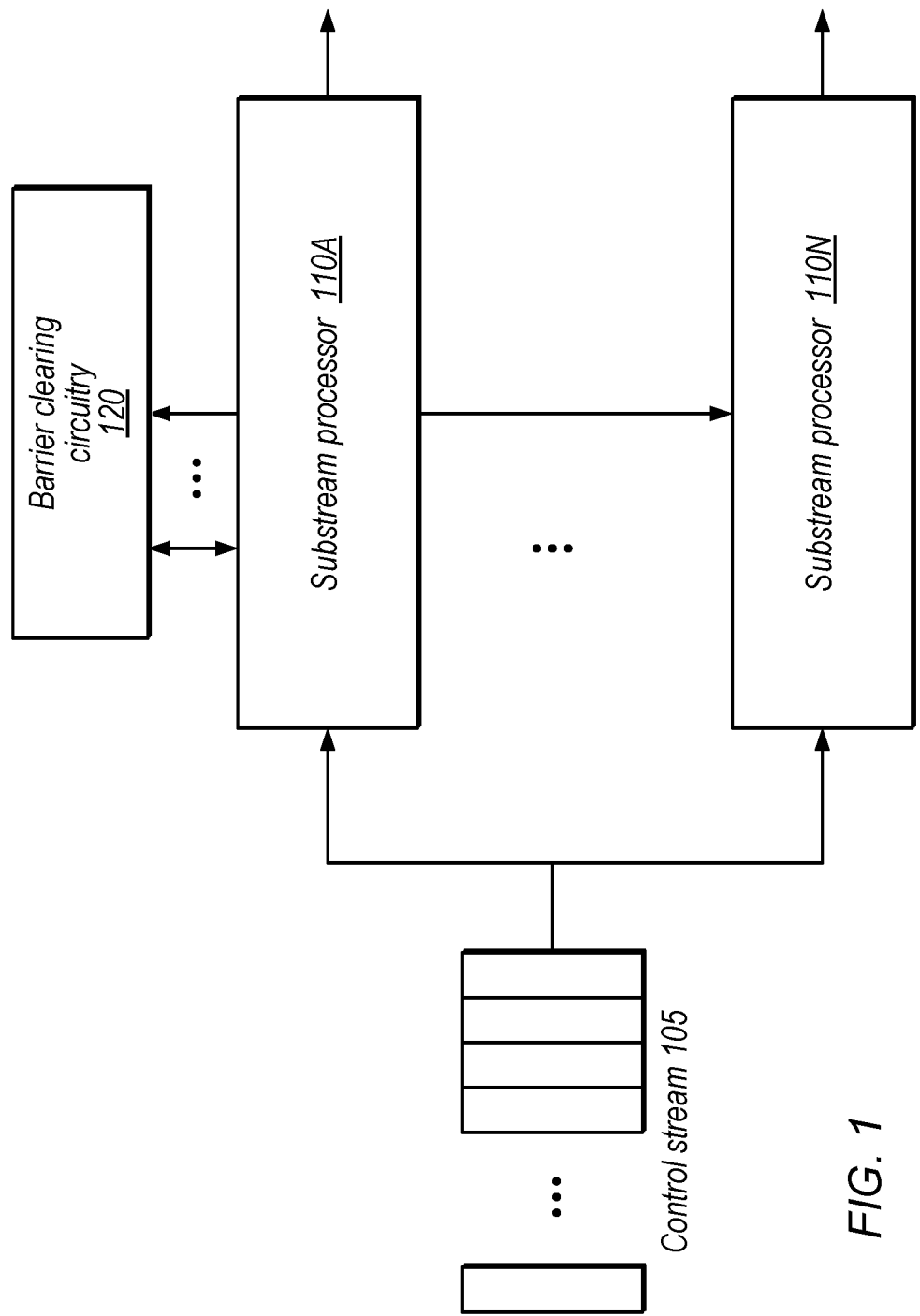
FIG. 1 is a block diagram illustrating example substream processors and barrier clearing circuitry, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. "A substream processor configured to parse a portion of a control stream" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Further, as used herein, the terms "first," "second," "third," etc. do not necessarily imply an ordering (e.g., temporal) between elements. For example, a referring to a "first" graphics operation and a "second" graphics operation does not imply an ordering of the graphics operation, absent additional language constraining the temporal relationship between these operations. In short, references such as "first," "second," etc. are used as labels for ease of reference in the description and the appended claims.

DETAILED DESCRIPTION

Overview of Substream Processing and Barrier Clearing

In various embodiments, a control stream (e.g., a compute control stream) includes multiple substreams and commands and may specify dependencies between substreams. For example, one substream may synchronize with another by waiting for the other substream to reach a specified point. In some embodiments, a processor includes a separate substream processor for each substream, which may allow indirect execution within each substream. In some embodiments, barrier clearing circuitry is configured to track substream progress and control synchronization between the substream processors.

FIG. 1 is a block diagram illustrating an example processor (e.g., a graphics processor) with substream synchronization, according to some embodiments. In the illustrated embodiment the processor includes barrier clearing circuitry 120 and multiple substream processors 110A-110N that process a control stream 105.

Substream processors 110, in the illustrated embodiment, are configured to process different substreams of control stream 105. For example, N different substream processors may separately parse N different substreams. In some embodiments, all substream processors 110 also process a global substream. Each substream processor may separately fetch the entire control stream but may parse only their assigned substream and the global substream. Different substreams and the global substream may be differentiated using headers in the control stream 105, for example. Embodiments of sub stream processors 110 are described in further detail below with reference to FIG. 4.

In some embodiments, control stream 105 includes kernels, links (which may redirect execution and may or may not include a return), and commands (e.g., barrier, cache flush, cache flush invalidate, wait on flush, etc.). Kernels may be compiled for a highly parallel processor such as a GPU. One common kernel organization is a three-dimensional kernel that includes a number of workgroups in each of the x, y, and z dimensions. As one example, a three-dimensional kernel may have a certain number of workitems in each of the x, y, and z dimensions. Workitems may be executed similarly to graphics threads. Kernels are often compiled routines for high throughput accelerators such as GPUs or DSPs. Kernels may be specified in their own programming language (e.g., OpenCL C), managed by a graphics API such as OpenGL, or embedded directly in application code (e.g., using C++AMP). In some embodiments, workitems are aggregated into structures called workgroups. Thus, a kernel may also have a certain number of workgroups in each of the multiple dimensions. The term "workgroup" is intended to be construed according to its well-understood meaning, which includes a portion of the operations in a compute kernel. Typically, compute work is sent to a shader core at workgroup granularity. Each workgroup may include multiple workitems. A "shader core" or "shader unit" refers to a processing element configured to execute shader programs. Typically, a GPU includes a large number of shader units for parallel processing. In addition to pixel and vertex shading programs, for example, shader cores may also be used to execute compute programs.

Note that, although shader cores and GPUs are discussed herein for purposes of illustration, the disclosed techniques are not limited to graphics processors, but may be applied to various parallel processor architectures. Similarly, although compute control streams are discussed herein, the disclosed techniques may be applied to any of various control streams, including control streams for vector or pixel work, for example.

Global barrier commands may indicate that all prior work in all sub streams should complete before proceeding past the barrier. Neighbor barrier commands may be used for substream synchronization, as discussed in further detail below. Note that the specific formatting and types of commands may vary among different implementations, including for different hardware that executes instructions of the same API.

Barrier clearing circuitry 120, in some embodiments, is configured to receive state and barrier information from substream processors 110 and control their processing. For example, when one substream is dependent on another substream, barrier clearing circuitry 120 may pause the corresponding substream processor until the other substream has reached a specified point.

Example Control Stream

Figure 2:
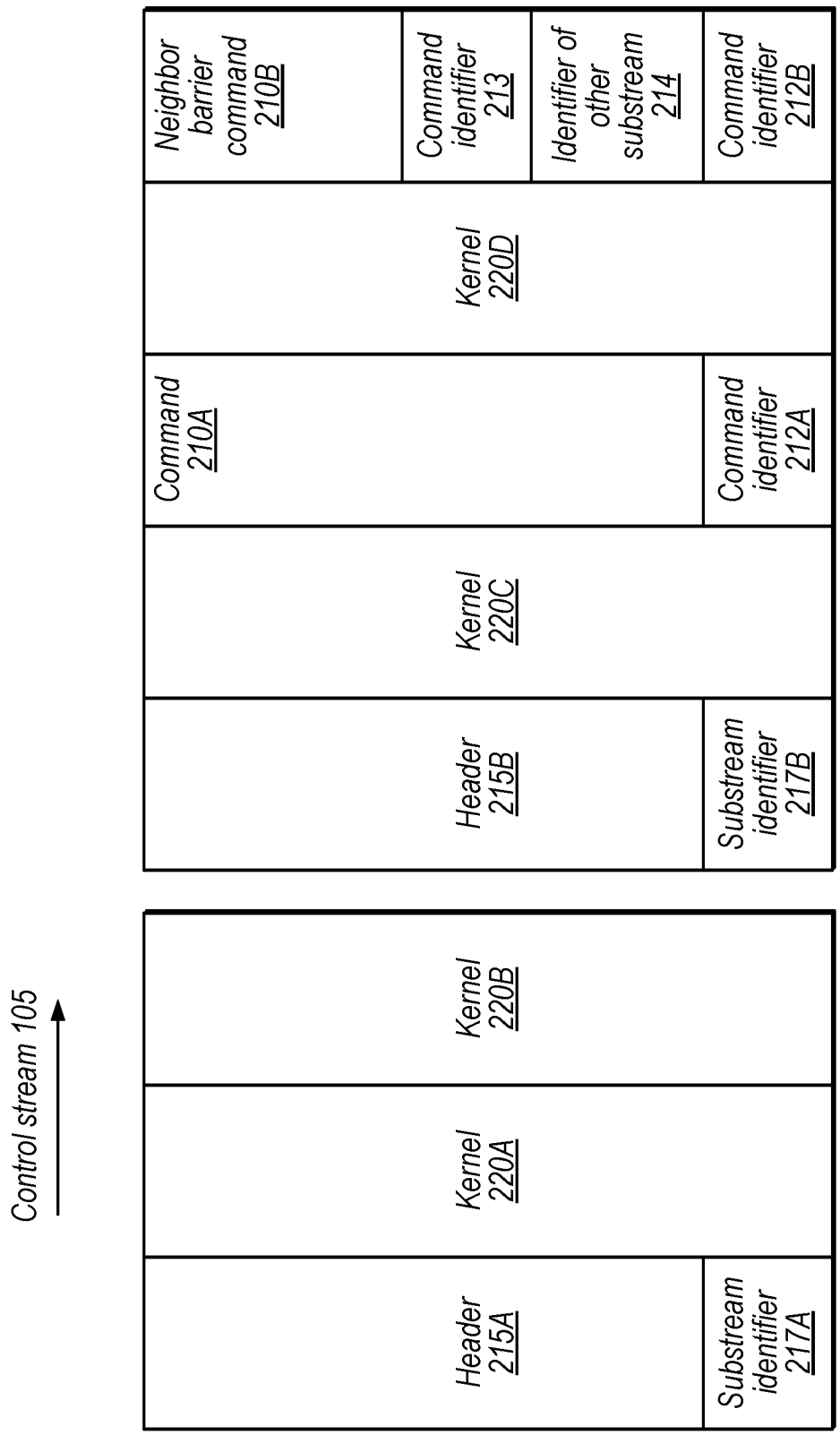
FIG. 2 is a block diagram illustrating an example control stream that includes a neighbor barrier command, according to some embodiments.

FIG. 2 is a diagram illustrating example control stream elements, according to some embodiments. In the illustrated embodiment, control stream 105 includes two headers 215A and 215B, two commands 210A and 210B, and four kernels 220A-220D. In the illustrated embodiment, control stream elements that are closer to the right-hand side of FIG. 2 are younger than control stream elements closer to the left.

Headers, in some embodiments, indicate the substream of subsequent commands and kernels, e.g., using a substream identifier 217. In the illustrated example, kernels 220A and 220B are in one substream, as specified by substream identifier 217A, while kernels 220C-220D and commands 210A and 210B are in another substream, as specified by substream identifier 217B. In some embodiments, each substream processor 110 is configured to store and parse control stream elements for its substream and discard or ignore elements for other substreams.

Commands 210, in the illustrated embodiment, each include a command identifier 212. In some embodiments, command identifiers are assigned according to a monotonic function, e.g., monotonically increasing. In some embodiments, command identifiers are uniquely assigned among all substreams in a control stream while in other embodiments command identifiers may be uniquely assigned within a substream (e.g., such that commands in different substreams may potentially have the same command identifier). In some embodiments, if a particular command does not have associated synchronization, then it may not be assigned a new command ID. In other embodiments, any of various appropriate techniques may be used to encode relative ages of commands within the overall stream or within substreams. In some embodiments, if software runs out of command identifiers for a control stream, it may reset and use a global barrier to ensure that the reset does not cause improper results.

As discussed above, a substream identifier 217 may identify a global substream that may be processed by all substream processors parsing the command stream. In some embodiments, this substream includes one or more global barriers that all substream processors should reach before any continue past the global barrier.

Neighbor barrier command 210B, in the illustrated embodiment, includes two fields that may be used for synchronization with another substream. Identifier 214 specifies another substream on which the current substream depends. Command identifier 213 specifies a command identifier that the other substream should reach before the current substream continues. Compute workloads are often specified using task graphs with a mix of dependent and non-dependent kernels. The disclosed techniques may facilitate parsing and execution of such workloads. In particular, the disclosed circuitry and control stream encoding techniques may advantageously facilitate parallel processing of substreams for non-dependent kernels while efficiently handling kernel dependencies across substreams.

Example Synchronization for Neighbor Barrier

Figure 3:
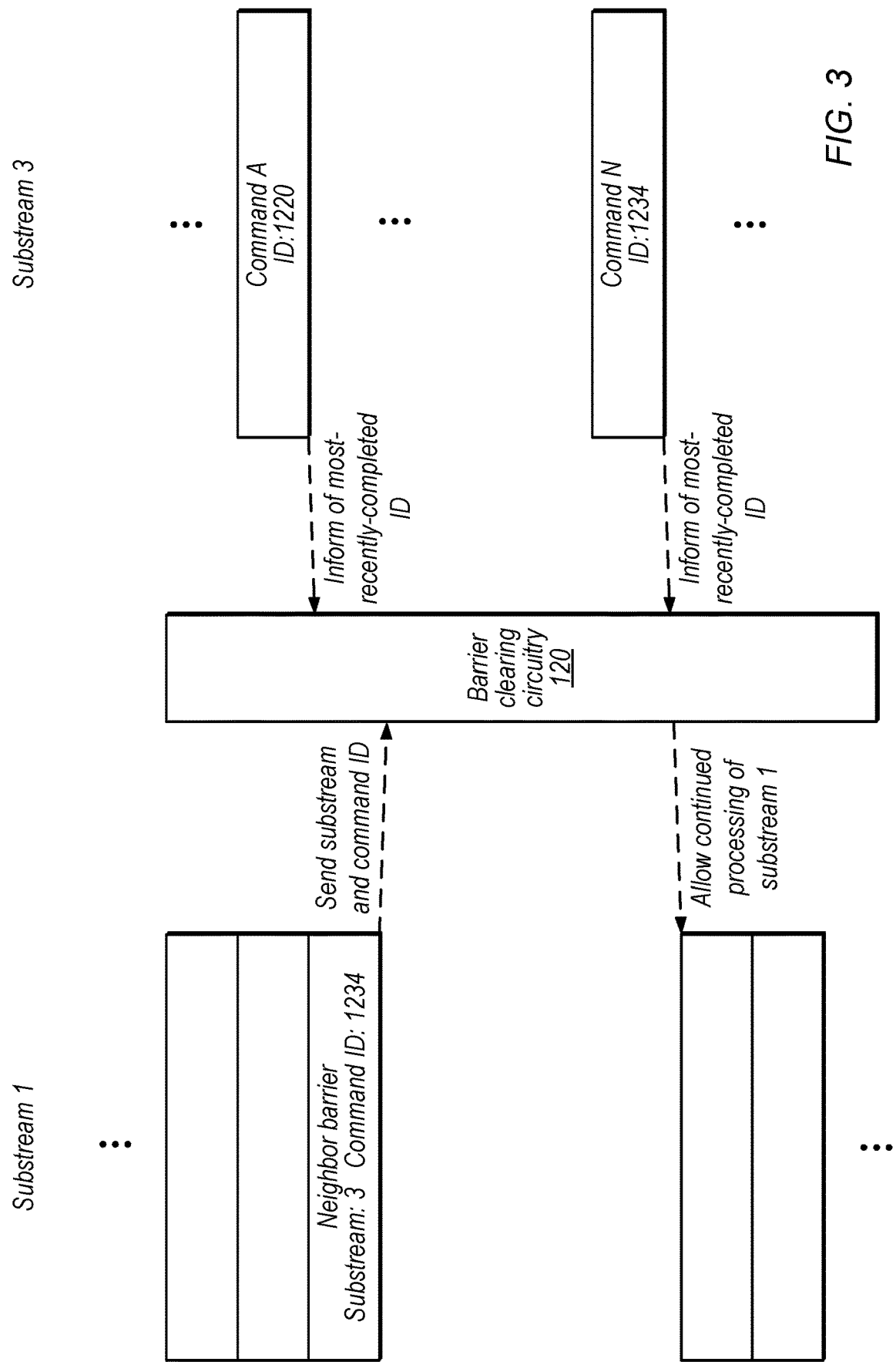
FIG. 3 is a flow diagram illustrating example substream synchronization, according to some embodiments.

FIG. 3 is a diagram illustrating example synchronization between substreams, according to some embodiments. In the illustrated embodiment, substream 1 includes a neighbor barrier command, which identifies substream 3 and a command identifier of "1234." The substream processor for substream 1 sends the substream and command identifier of the neighbor barrier to barrier clearing circuitry 120, which pauses parsing of substream 1 because substream 3 has not reached the indicated command identifier. Substream 3 includes command A and command N, with respective identifiers of "1220" and "1234." In some embodiments, each time it processes a command, substream 3 indicates its most-recently-completed command identifier to barrier clearing circuitry 120. In other embodiments, a substream processor may indicate its most-recently-completed command identifier in response to a command ID synchronization packet in its substream. In these embodiments, synchronization packets may be attached to other commands (e.g., cache flush, barrier, etc.) but are not attached for neighbor barrier commands. This may allow command ID synchronization points to stay in order relative to other commands and kernels.

In response to receiving an indication of completion of command N (which has a command identifier that is greater than or equal to the identifier from the neighbor barrier), barrier clearing circuitry 120 allows continued processing of substream 1. In some embodiments, for a global barrier command, barrier clearing circuitry 120 stops all controlled substreams until they have all reached the global barrier command.

Detailed Example Substream Processors

Figure 4:
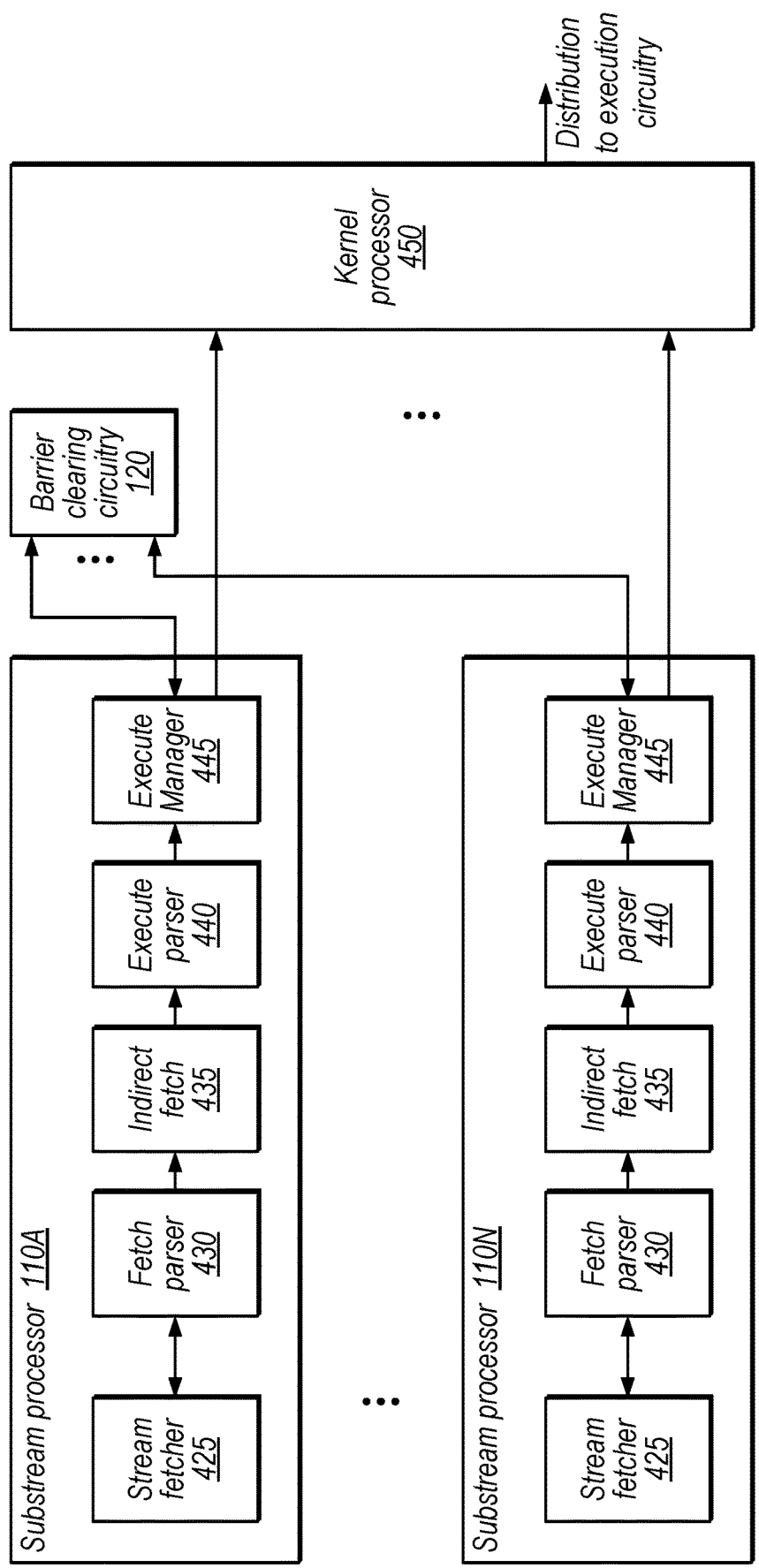
FIG. 4 is a block diagram illustrating example substream processors in more detail, according to some embodiments.

FIG. 4 is a block diagram illustrating substream processors in more detail, according to some embodiments. In the illustrated embodiment, a processor includes substream processors 110A-110N, barrier clearing circuitry 120, and kernel processor 450. Each substream processor 110, in the illustrated embodiment, includes a stream fetcher 425, fetch parser 430, indirect fetch circuitry 435, execute parser 440, and execute manager 445.

Stream fetcher 425, in some embodiments, is configured to fetch control stream data and store the data in a control stream data buffer. In some embodiments, a write pointer indicates the location for the next control stream data in the buffer. In some embodiments, stream fetcher 425 is configured to fetch control stream data sequentially until it is re-directed or stopped by downstream processing. This may result in pre-fetching control stream data that is not actually used, but may provide performance benefits, e.g., by avoiding memory fetch latency that may consume a substantial number of cycles. In some embodiments, the compute control stream data is stored sequentially, but also includes link packets that redirect the fetch address and indirect kernel packets that require indirect data accesses.

Fetch parser 430, in some embodiments, is configured to examine at least a portion of the packet indicated by a fetch parse pointer to identify its packet type. In some embodiments, if the packet is a link, fetch parser 430 is configured to redirect stream fetcher 425 and invalidate all younger data and requests in the control stream data buffer and the memory hierarchy (not shown). Fetch parser 430, in the illustrated embodiment, is configured to send indirect kernels to indirect fetcher 435.

Indirect fetcher 435, in some embodiments, is configured to perform indirect fetches (e.g., via a cache/memory hierarchy) and store return data. An "indirect" kernel refers to a kernel for which a memory access outside the compute command stream is needed. For example, a direct kernel may specify the size of the kernel in each dimension within the compute command stream while an indirect kernel may specify an address in the compute command stream. Indirect fetcher 435 may access this address in memory to determine information for the structure (such as the size of the kernel). Once return data is stored, indirect fetcher 435 is configured to notify downstream logic (e.g., execute parser 440) that data is available. In some embodiments, indirect fetcher 435 includes a request queue for indirect kernels from fetch parser 430. In some embodiments, this allows the fetch parser to work past indirect kernels in the control stream while waiting for indirect fetch returns.

In some embodiments, indirect fetches should not prefetch behind certain memory ordering operations such as barrier or wait-on-flush operations, e.g., because an instruction before these operations may alter the indirect data. Therefore, in some embodiments, fetch parser 430 is configured to maintain a counter that indicates the number of outstanding memory ordering operations. For example, fetch parser 430 may increment the counter for each encountered barrier and wait-on-flush and decrement the counter when one of those operations is executed. In some embodiments, fetch parser 430 may send indirect kernels to indirect fetcher 435 only when the counter value indicates that there are no outstanding older memory ordering operations of one or more monitored types. In some embodiments, the value of the counter may be re-loaded on a context load, e.g., by analyzing restored data in the control stream data buffer.

Execute parser 440, in some embodiments, is configured to process packets identified by the execution parse pointer. Execute parser 440 may receive control stream data from two sources: the control stream data buffer of stream fetcher 425 and the indirect fetcher 435. During operation, an execution parse pointer may lag behind the fetch parse pointer, which may increase ability to hide memory latency (e.g., by allowing the fetch parser 430 to identify links and indirect kernels quickly and begin handling these situations before execution parser 440 is ready for the packets). In the illustrated embodiment, for indirect kernels, indirect fetcher 435 is configured to indicate when the data is available to execute parser 440. In some embodiments, once all of a given packet's data is present, execute parser 440 sends the packet in full form to execute manager 445 and increments the execution parse pointer. For example, full form compute kernels may be stored in a decoded format that is recognized by downstream circuitry (e.g., kernel processor 450).

Execute manager 445, in some embodiments, maintains a command queue, manages dependencies, and dispatches commands and kernels for execution. Kernel processor 450, in some embodiments, is configured to break down kernels into smaller portions (e.g., workgroups or workitems) and dispatch the portions to execution circuitry (e.g., programmable graphics shader circuitry). In some embodiments, execute manager 445 maintains state information indicating the most-recently-completed command identifier for the substream processor and communicates this information to barrier clearing circuitry 120. Barrier clearing circuitry 120, in the illustrated embodiment, is configured to inform an execute manager 445 when it can proceed past a barrier command.

Example Method

Figure 5:
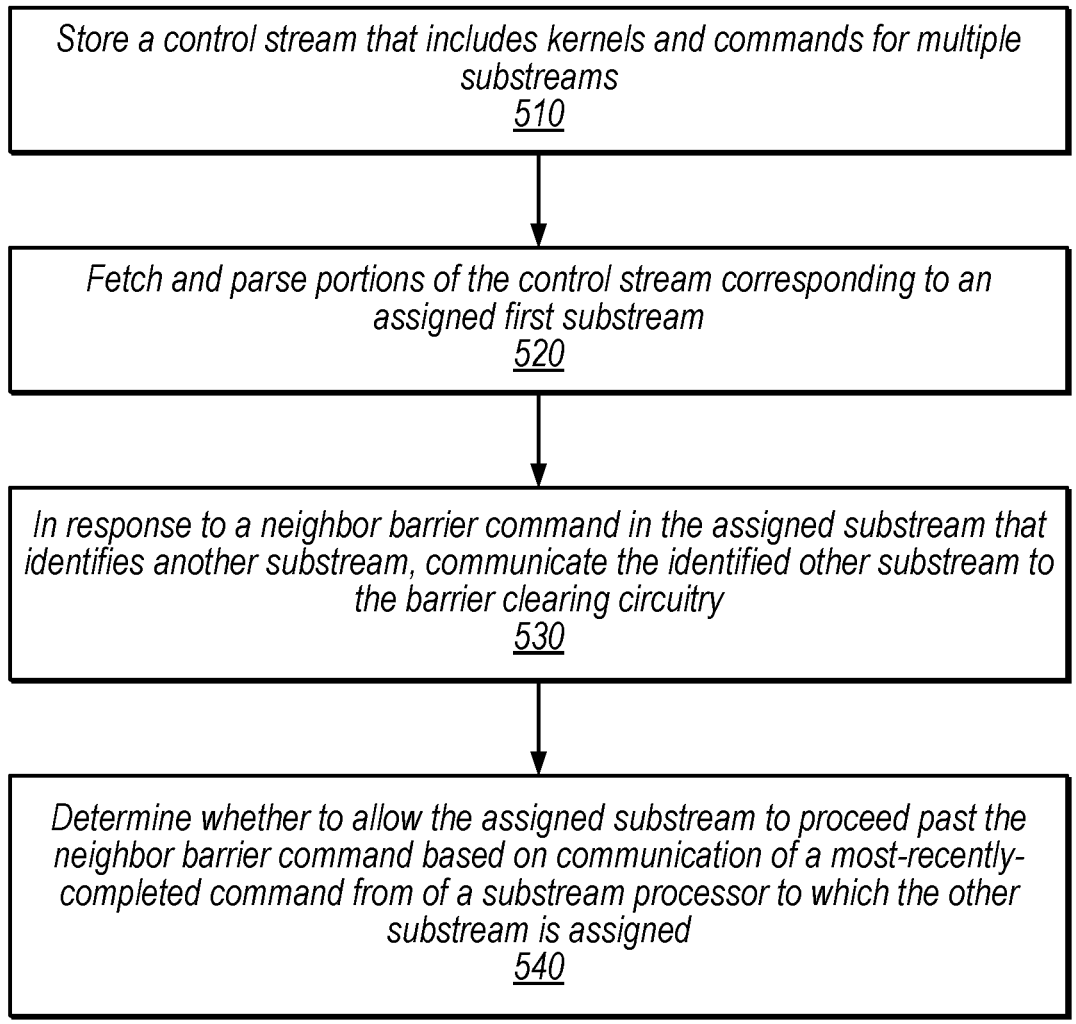
FIG. 5 is a flow diagram illustrating an example method for synchronization using neighbor barrier commands, according to some embodiments.

FIG. 5 is a flow diagram illustrating a method for processing a control stream, according to some embodiments. The method shown in FIG. 5 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 510, in the illustrated embodiment, one or more storage elements store a control stream that includes kernels and commands for multiple substreams. In some embodiments, the command stream includes a global substream that is parsed by all substream processors in a set of substream processors parsing the control stream. In some embodiments, the stream is a compute control stream whose kernels are executed by a graphics processor.

At 520, in the illustrated embodiment, substream processors in a set of multiple sub stream processors each fetch and parse portions of the control stream corresponding to an assigned substream. Note that this may include each substream controller fetching the entire substream and parsing out its assigned substream and the global substream. In some embodiments, the control stream includes header information that indicates the substream of subsequent kernels and commands and the substream processors may process their assigned substream based on the header information.

At 530, in the illustrated embodiment, a substream processor, in response to a neighbor barrier command in the assigned substream that identifies another substream, communicates the identified other substream to the barrier clearing circuitry. In some embodiments, the substream processor, in response to the neighbor barrier command, communicates a first command identifier of the neighbor barrier command. In some embodiments, command identifiers are assigned to commands according to a monotonic function.

At 540, in the illustrated embodiment, the barrier clearing circuitry determines whether to allow the assigned substream to proceed past the neighbor barrier command based on communication of a most-recently-completed command from of a substream processor to which the other substream is assigned.

In some embodiments, in response to a global barrier command in the global substream, a substream processor indicates the global barrier to the barrier clearing circuitry and the barrier clearing circuitry prevents the substream processors in the set from proceeding past the global barrier until each substream processor in the set has reached the global barrier command.

In some embodiments, a substream processor in the set is configured to process a stream link command in its assigned substream to fetch and parse a secondary control stream. The stream link command may be a stream link with return, which may redirect back to the assigned substream after processing the secondary control stream.

Example Device

Figure 6:
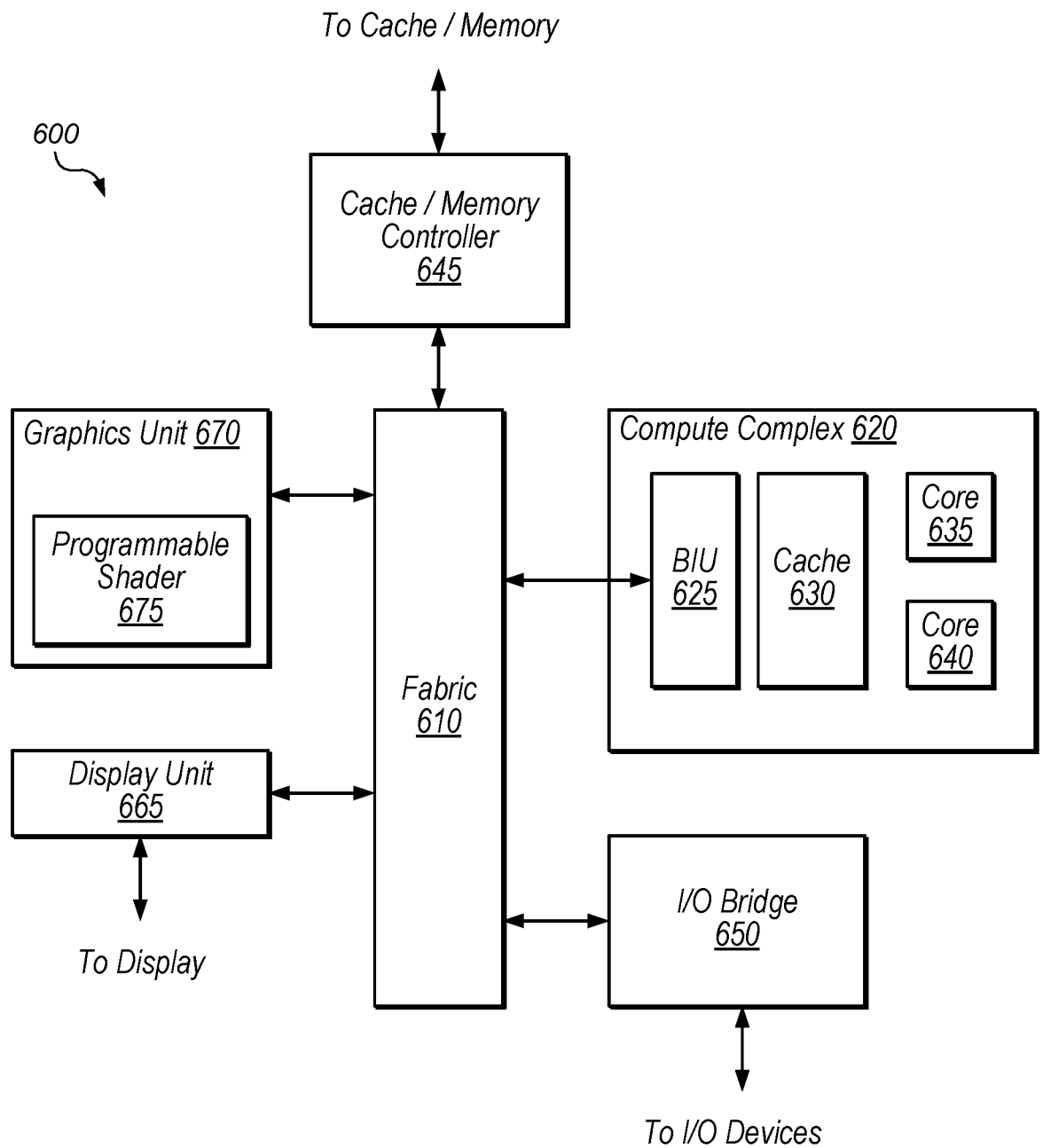
FIG. 6 is a block diagram illustrating an example computing device that may implement substream processors, according to some embodiments.

Referring now to FIG. 6, a block diagram illustrating an example embodiment of a device 600 is shown. In some embodiments, elements of device 600 may be included within a system on a chip. In some embodiments, device 600 may be included in a mobile device, which may be battery-powered. Therefore, power consumption by device 600 may be an important design consideration. In the illustrated embodiment, device 600 includes fabric 610, compute complex 620 input/output (I/O) bridge 650, cache/memory controller 645, graphics unit 670, and display unit 665. In some embodiments, device 600 may include other components (not shown) in addition to and/or in place of the illustrated components, such as video processor encoders and decoders, image processing or recognition elements, computer vision elements, etc.

The techniques disclosed herein may be utilized in various processors of various types of computing devices. For example, graphics unit 670 may include substream processors configured to parse kernels for execution by programmable shader 675.

Fabric 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally.

In the illustrated embodiment, compute complex 620 includes bus interface unit (BIU) 625, cache 630, and cores 635 and 640. In various embodiments, compute complex 620 may include various numbers of processors, processor cores and/or caches. For example, compute complex 620 may include 1, 2, or 4 processor cores, or any other suitable number. In one embodiment, cache 630 is a set associative L2 cache. In some embodiments, cores 635 and/or 640 may include internal instruction and/or data caches. In some embodiments, a coherency unit (not shown) in fabric 610, cache 630, or elsewhere in device 600 may be configured to maintain coherency between various caches of device 600. BIU 625 may be configured to manage communication between compute complex 620 and other elements of device 600. Processor cores such as cores 635 and 640 may be configured to execute instructions of a particular instruction set architecture (ISA) which may include operating system instructions and user application instructions.

Cache/memory controller 645 may be configured to manage transfer of data between fabric 610 and one or more caches and/or memories. For example, cache/memory controller 645 may be coupled to an L3 cache, which may in turn be coupled to a system memory. In other embodiments, cache/memory controller 645 may be directly coupled to a memory. In some embodiments, cache/memory controller 645 may include one or more internal caches.

As used herein, the term "coupled to" may indicate one or more connections between elements, and a coupling may include intervening elements. For example, in FIG. 6, graphics unit 670 may be described as "coupled to" a memory through fabric 610 and cache/memory controller 645. In contrast, in the illustrated embodiment of FIG. 6, graphics unit 670 is "directly coupled" to fabric 610 because there are no intervening elements.

Graphics unit 670 may include one or more processors and/or one or more graphics processing units (GPU's). Graphics unit 670 may receive graphics-oriented instructions, such as OPENGL®, Metal, or DIRECT3D® instructions, for example. Graphics unit 670 may execute specialized GPU instructions or perform other operations based on the received graphics-oriented instructions. Graphics unit 670 may generally be configured to process large blocks of data in parallel and may build images in a frame buffer for output to a display. Graphics unit 670 may include transform, lighting, triangle, and/or rendering engines in one or more graphics processing pipelines. Graphics unit 670 may output pixel information for display images. Programmable shader 675, in various embodiments, may include highly parallel execution cores configured to execute graphics programs, which may include pixel tasks, vertex tasks, and compute tasks (which may or may not be graphics-related).

Display unit 665 may be configured to read data from a frame buffer and provide a stream of pixel values for display. Display unit 665 may be configured as a display pipeline in some embodiments. Additionally, display unit 665 may be configured to blend multiple frames to produce an output frame. Further, display unit 665 may include one or more interfaces (e.g., MIPI® or embedded display port (eDP)) for coupling to a user display (e.g., a touchscreen or an external display).

I/O bridge 650 may include various elements configured to implement: universal serial bus (USB) communications, security, audio, and/or low-power always-on functionality, for example. I/O bridge 650 may also include interfaces such as pulse-width modulation (PWM), general-purpose input/output (GPIO), serial peripheral interface (SPI), and/or inter-integrated circuit (I2C), for example. Various types of peripherals and devices may be coupled to device 600 via I/O bridge 650.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 7:
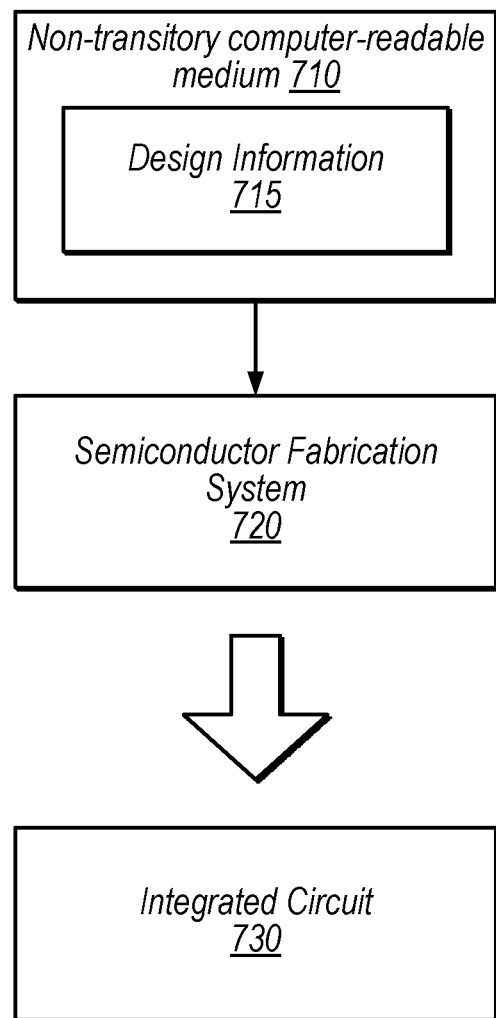
FIG. 7 is a block diagram illustrating an example computer-readable medium that stores circuit design information, according to some embodiments.

FIG. 7 is a block diagram illustrating an example non-transitory computer-readable storage medium that stores circuit design information, according to some embodiments. In the illustrated embodiment semiconductor fabrication system 720 is configured to process the design information 715 stored on non-transitory computer-readable medium 710 and fabricate integrated circuit 730 based on the design information 715.

Non-transitory computer-readable storage medium 710, may comprise any of various appropriate types of memory devices or storage devices. Non-transitory computer-readable storage medium 710 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 710 may include other types of non-transitory memory as well or combinations thereof. Non-transitory computer-readable storage medium 710 may include two or more memory mediums which may reside in different locations, e.g., in different computer systems that are connected over a network.

Design information 715 may be specified using any of various appropriate computer languages, including hardware description languages such as, without limitation: VHDL, Verilog, SystemC, SystemVerilog, RHDL, M, MyHDL, etc. Design information 715 may be usable by semiconductor fabrication system 720 to fabricate at least a portion of integrated circuit 730. The format of design information 715 may be recognized by at least one semiconductor fabrication system 720. In some embodiments, design information 715 may also include one or more cell libraries which specify the synthesis and/or layout of integrated circuit 730. In some embodiments, the design information is specified in whole or in part in the form of a netlist that specifies cell library elements and their connectivity.

Design information 715, taken alone, may or may not include sufficient information for fabrication of a corresponding integrated circuit. For example, design information 715 may specify the circuit elements to be fabricated but not their physical layout. In this case, design information 715 may need to be combined with layout information to actually fabricate the specified circuitry.

Integrated circuit 730 may, in various embodiments, include one or more custom macrocells, such as memories, analog or mixed-signal circuits, and the like. In such cases, design information 715 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 720 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 720 may also be configured to perform various testing of fabricated circuits for correct operation.

In various embodiments, integrated circuit 730 is configured to operate according to a circuit design specified by design information 715, which may include performing any of the functionality described herein. For example, integrated circuit 730 may include any of various elements shown in FIG. 1, 4, or 6. Further, integrated circuit 730 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
graphics processor circuitry configured to execute instructions specified by kernels;
one or more storage elements configured to store a control stream that includes kernels and commands, wherein the control stream includes multiple substreams;
barrier clearing circuitry; and
a set of multiple substream processors, wherein ones of the substream processors are configured to:
fetch and parse portions of the control stream corresponding to an assigned sub stream;
in response to a neighbor barrier command in the assigned substream that identifies another substream, communicate the identified other substream to the barrier clearing circuitry;
wherein the barrier clearing circuitry is configured to determine whether to allow the assigned substream to proceed past the neighbor barrier command based on communication of a most-recently-completed command from of a substream processor to which the other substream is assigned.

2. The apparatus of claim 1, wherein the control stream indicates command identifiers assigned to ones of the commands;
wherein the substream processor is configured to, in response to the neighbor barrier command, communicate a first command identifier of the neighbor barrier command; and
wherein the barrier clearing circuitry is configured to determine whether to allow the assigned substream to proceed past the neighbor barrier command based on the first command identifier and a command identifier of the most-recently-completed command from of a substream processor to which the other substream is assigned.

3. The apparatus of claim 2, wherein the command identifiers are assigned to the commands according to a monotonic function.

4. The apparatus of claim 1, wherein the control stream includes header information that indicates the substream of subsequent kernels and commands.

5. The apparatus of claim 1, wherein the control stream includes a global substream that multiple substream processors are configured to fetch and parse.

6. The apparatus of claim 5, wherein, in response to a global barrier command in the global substream, a substream processor is configured to indicate the global barrier command to the barrier clearing circuitry and wherein the barrier clearing circuitry is configured to prevent the substream processors in the set from proceeding past the global barrier command until all substream processors in the set have reached the global barrier command.

7. The apparatus of claim 1, wherein ones of the substream processors in the set are configured to process a stream link command in its assigned substream to fetch and parse a secondary control stream.

8. The apparatus of claim 1, wherein the control stream is a compute control stream that indicates compute kernels to be executed by a graphics processor.

9. A non-transitory computer-readable medium having instructions stored thereon that include:
a control stream that includes kernels and commands, wherein instructions of the kernels are executable by one or more graphics processors to perform one or more operations, wherein the control stream includes multiple substreams;
wherein multiple ones of the substreams are for fetching and parsing by respective assigned substream processors in a set of substream processors; and
wherein a first substream includes a neighbor barrier command that identifies a second substream, wherein the neighbor barrier command indicates to prevent a first substream processor to which the first substream is assigned from proceeding past the neighbor barrier command until a most-recently-completed command, from a second substream processor to which the second substream has assigned, meets a threshold.

10. The non-transitory computer-readable medium of claim 9, wherein the control stream indicates command identifiers assigned to ones of the commands;
wherein the neighbor barrier command indicates a command identifier of the second substream; and
wherein the neighbor barrier command indicates that the first substream is not to proceed past the neighbor barrier command until a command identifier of the most-recently-completed command from the second substream processor meets the command identifier indicated in the neighbor barrier command.

11. The non-transitory computer-readable medium of claim 10, wherein the command identifiers are assigned to commands according to a monotonic function.

12. The non-transitory computer-readable medium of claim 9, wherein the control stream includes header information that indicates the substream of subsequent kernels and commands.

13. The non-transitory computer-readable medium of claim 9, wherein the control stream includes a global substream for parsing by substream processors in the set;
wherein the global substream includes a global barrier command which all substream processors in the set are to reach before any of the substream processors in the set proceed past the global barrier command.

14. The non-transitory computer-readable medium of claim 9, wherein multiple substreams in the control stream include respective stream link commands that indicate to fetch and parse a secondary control stream.

15. A non-transitory computer readable storage medium having stored thereon design information that specifies a design of at least a portion of a hardware integrated circuit in a format recognized by a semiconductor fabrication system that is configured to use the design information to produce the circuit according to the design, including:
graphics processor circuitry configured to execute instructions specified by kernels;
one or more storage elements configured to store a control stream that includes kernels and commands, wherein the control stream includes multiple substreams;
barrier clearing circuitry; and
a set of multiple substream processors, wherein ones of the substream processors are configured to:
fetch and parse portions of the control stream corresponding to an assigned sub stream;
in response to a neighbor barrier command in the assigned substream that identifies another substream, communicate the identified other substream to the barrier clearing circuitry;
wherein the barrier clearing circuitry is configured to determine whether to allow the assigned substream to proceed past the neighbor barrier command based on communication of a most-recently-completed command from of a substream processor to which the other substream is assigned.

16. The non-transitory computer readable storage medium of claim 15, wherein the control stream indicates command identifiers assigned to ones of the commands;
  wherein the substream processor is configured to, in response to the neighbor barrier command, communicate a first command identifier of the neighbor barrier command; and
  wherein the barrier clearing circuitry is configured to determine whether to allow the assigned substream to proceed past the neighbor barrier command based on the first command identifier and a command identifier of the most-recently-completed command from of a substream processor to which the other substream is assigned.

17. The non-transitory computer readable storage medium of claim 15, wherein the control stream includes header information that indicates the substream of subsequent kernels and commands.

18. The non-transitory computer readable storage medium of claim 15, wherein the control stream includes a global substream that multiple substream processors are configured to fetch and parse.

19. The non-transitory computer readable storage medium of claim 18, wherein, in response to a global barrier command in the global substream, a substream processor is configured to indicate the global barrier to the barrier clearing circuitry and wherein the barrier clearing circuitry is configured to prevent the substream processors in the set from proceeding past the global barrier until all substream processors in the set have reached the global barrier command.

20. The non-transitory computer readable storage medium of claim 15, wherein ones of the substream processors in the set are configured to process a stream link command in its assigned substream to fetch and parse a secondary control stream.

* * * * *